Feb. 6, 1945. E. HERDECK 2,368,925
PANTOGRAPH FOR MECHANICAL STENCIL DUPLICATION
Filed July 5, 1943 5 Sheets-Sheet 1
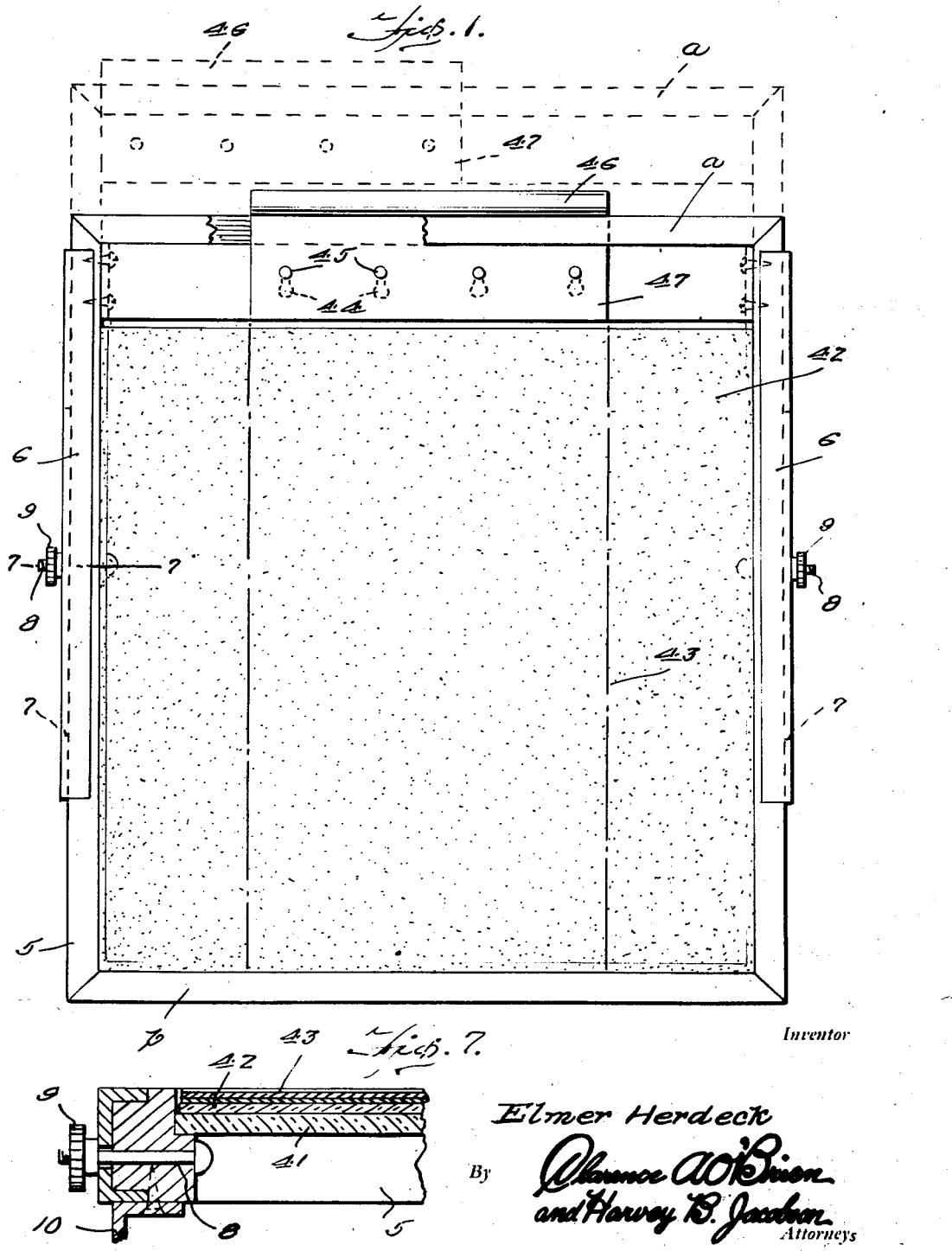
Inventor
Elmer Herdeck

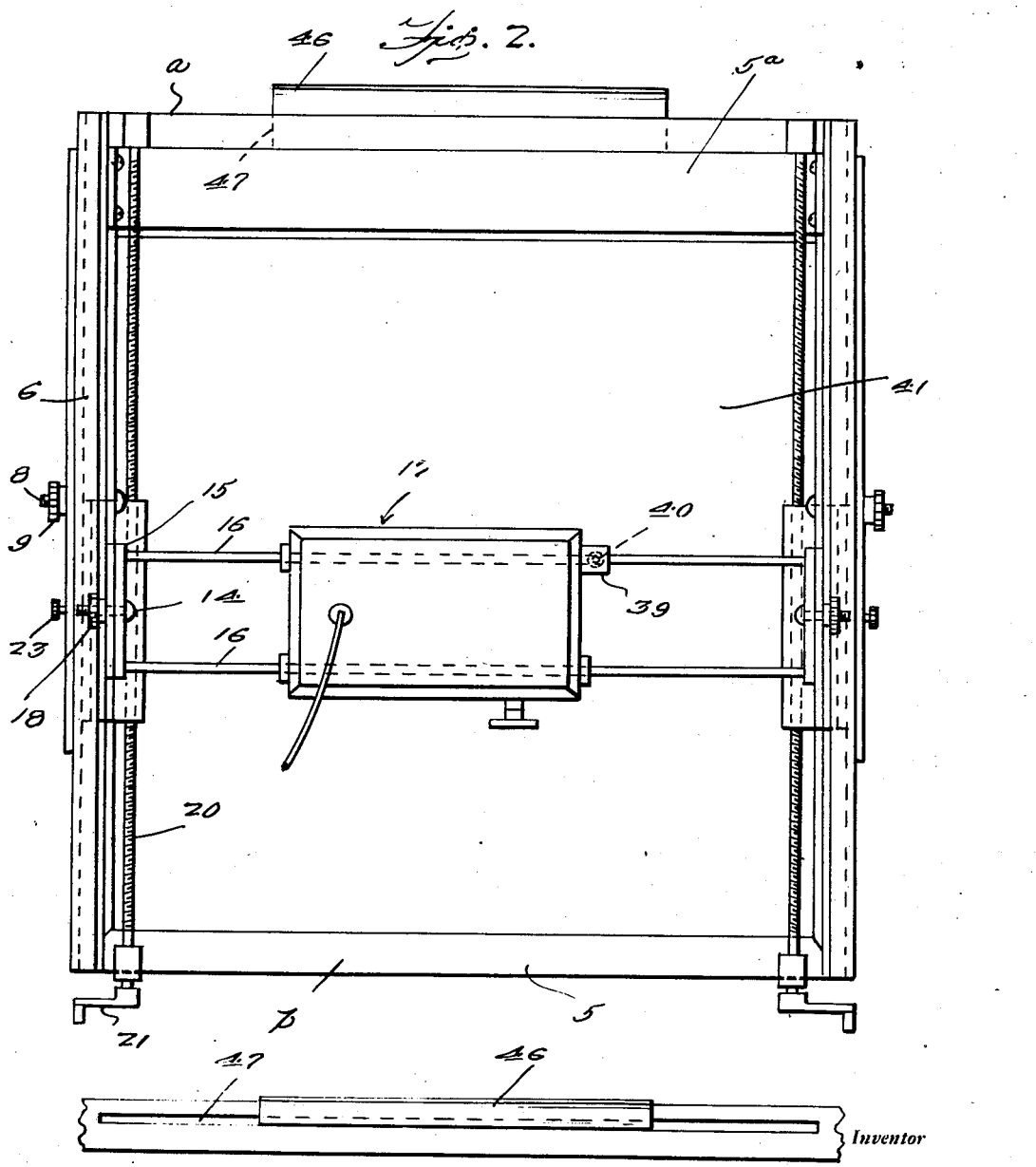

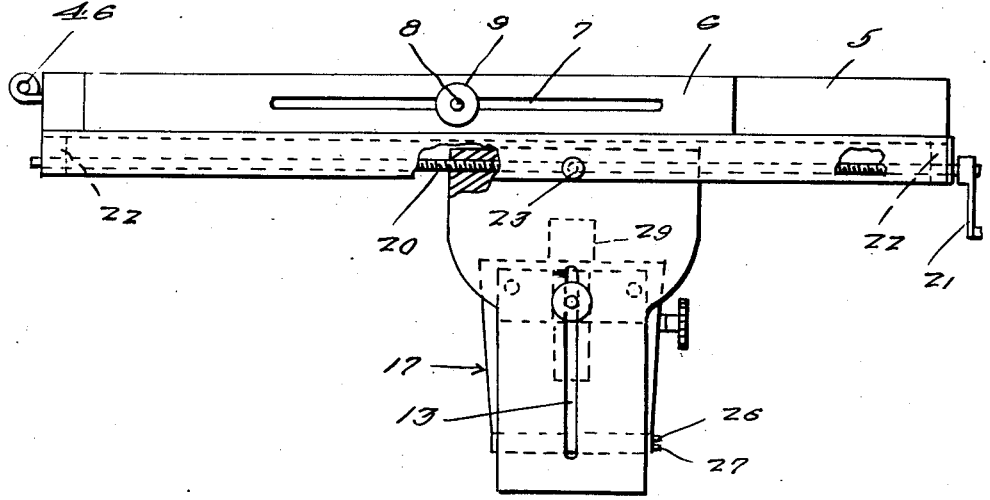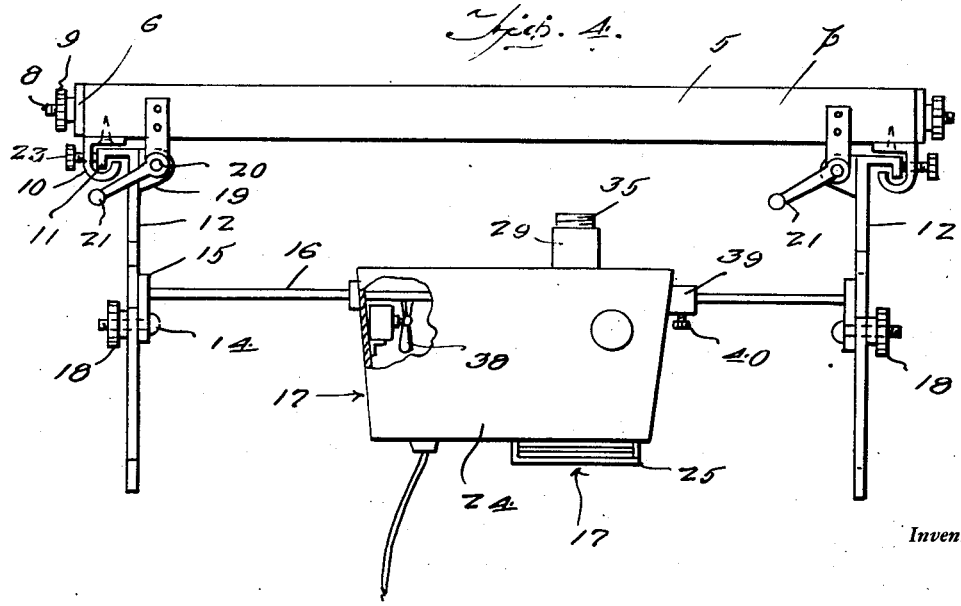

Feb. 6, 1945.  E. HERDECK  2,368,925
PANTOGRAPH FOR MECHANICAL STENCIL DUPLICATION
Filed July 5, 1943  5 Sheets-Sheet 4
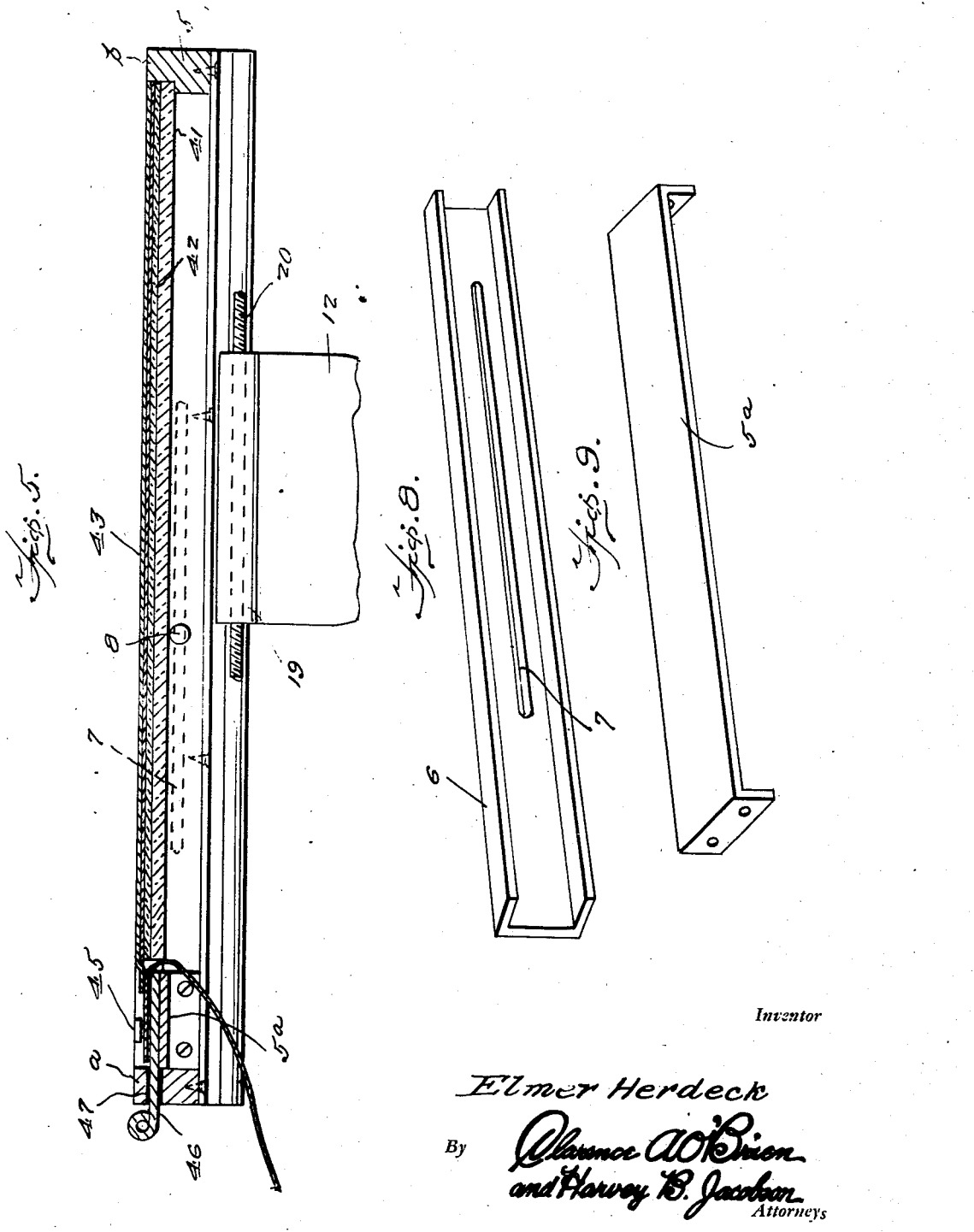
Inventor
Elmer Herdeck
By Clarence A. O'Brien
and Harvey B. Jacobson
Attorneys Feb. 6, 1945.  E. HERDECK  2,368,925
PANTOGRAPH FOR MECHANICAL STENCIL DUPLICATION
Filed July 5, 1943   5 Sheets—Sheet 5
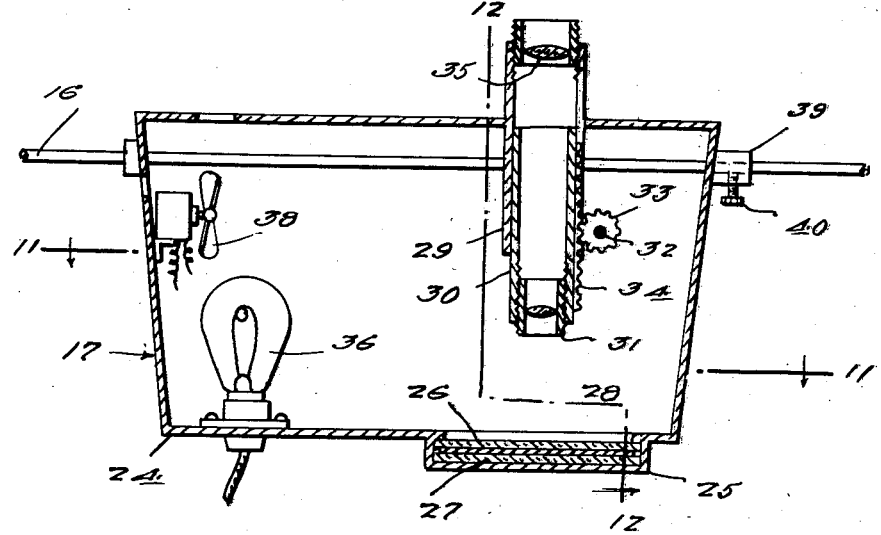
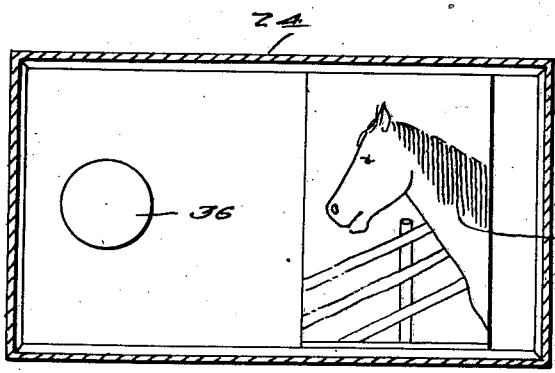
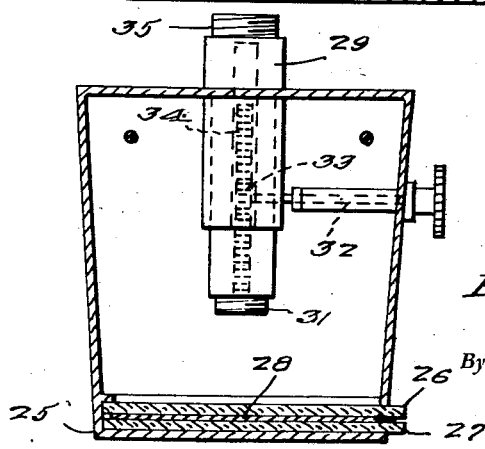
Inventor
Elmer Herdeck Patented Feb. 6, 1945

2,368,925

UNITED STATES PATENT OFFICE 2,368,925

PANTOGRAPH FOR MECHANICAL STENCIL DUPLICATION

Elmer Herdeck, Elmhurst, Ill.

Application July 5, 1943, Serial No. 493,605

2 Claims. (Cl. 88—24)

This invention relates to new and useful improvements in apparatus for the multiple reproduction of pictures and other intelligence, the principal object being to provide an apparatus for accurately exhibiting pictures and other visible intelligence while the same is being traced or otherwise duplicated.

Another important object of the invention is to provide an apparatus for reproducing pictures and other visible intelligence for the purpose of tracing or otherwise copying the same, wherein the device is operative either to enlarge the subject matter or decrease its size.

Other important objects and advantages of the invention will become apparent to the reader of the following description.

In the drawings:

Figure 1 represents a top plan view of the device.

Figure 2 is a bottom plan view.

Figure 3 is a side elevational view.

Figure 4 is a front elevational view.

Figure 5 is a longitudinal sectional view.

Figure 6 is an end elevational view looking at the opposite end from that shown in Figure 4.

Figure 7 is a fragmentary enlarged detailed sectional view taken substantially on line 7—7 of Figure 1.

Figure 8 is a perspective view of one of the adjustable side pieces.

Figure 9 is a perspective view of the bridge member.

Figure 10 is a vertical sectional view through the projector.

Figure 11 is a section on line 11—11 of Figure 10.

Figure 12 is a section on line 12—12 of Figure 10.

Referring to the drawings, wherein like numerals designate like parts, it can be seen that numeral 5 denotes a frame divided into a pair of sections a, b, the section a being connected to the leg portions of the section b by channeled slide members 6, 6, these slide members 6, 6 being formed with longitudinal slots 7 through which bolts 8 are disposed, these bolts being disposed through the leg portions of the section a and equipped with knurled nuts 9 at their outer end. Thus the frame sections can be adjusted to the desired extent and there held by the nuts 9.

Trough-like runners 10 are secured to the leg portions of the frame section b and into these are disposed the lateral flanges 11 on the upper ends of a pair of supporting walls 12, 12, these supporting walls 12, 12 being formed with vertical slots 13 for receiving bolts 14 which pass through slide plates 15. Between these slide plates 15 is a bridge rod 16 which slidably supports a projector 17. It can be seen that each bolt 14 has a nut 18 and by unloosening these nuts 18, the projector 17 can be vertically adjusted.

The inner side of the upper portion of each of the side walls 12 has an internally threaded formation 19 through which a corresponding screw shaft 20 is disposed and each of these shafts has a hand crank 21 at one end thereof. Bearing structures 22 are provided on the frame 5 through which the ends of the shaft 20 are journaled. It can be seen by rotating the handles 21, the shaft 20 can be rotated to free the frame to the desired position over the projector 17, by means of the trough and flange connection 10, 11. Further, the parts can be held together when properly adjusted by set screws 23.

The projector 17 consists of a box 24 having a pocket formation 25 in one end of the bottom thereof, and in this is located a pair of panes 26, 27, between which a picture or other visible subject 28 can be placed. These panes and picture are located under a vertical tube 29 which extends through the top of the box 24 and has a telescopic tube 30 therein carrying an adjustable lens unit 31. A shaft 32 extends into the box 24 and carries a gear 33 which acts on rack teeth 34 formed on the tube 30. An adjustable lens unit 35 is provided at the upper end of the tube 29. Thus, the desired focusing of the picture can be readily obtained.

A source of light 36 is provided in the opposite corner of the box and light from this source results in the projection of the image of the subject 28 through the lens units 31, 35 to the transcribing sheet which will be described hereinafter.

A suitable fan or other cooling means 38 is provided in the box 24.

The bridge rod or rods 16 pass through the upper portion of the box 24 and through collars 39 projecting from the box, these collars being provided with set screws 40 for adjustably holding the box 24 in adjusted position on the bridge rod or rods 16.

In the frame 5 is a translucent elongated pane 41 (ground glass) which forms a platform upon which a pane 42 is disposed, and upon that is placed the usual stencil 43. It is preferable that this stencil be of a conventional type such as have keyhole slots 44 at one end as suggested in Figure 1. These keyhole slots receive buttons 45 located on a slide plate 46 which is slidably disposed in a slot 47 in one end of the frame to the end that the stencil sheet can be adjusted laterally in the frame.

Thus it can be seen that various factors are accountable for the ready adjustment of the various parts so that duplication of visible intelligence can be made in any selected part of the frame.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

1. A duplicating apparatus of the character described comprising a translucent platform, a subject projecting unit under the platform, a frame for the platform comprising sections extensible in a common horizontal plane, a stencil carrier slidably mounted in one of said sections, means to adjust said frame in a horizontal plane in opposite directions, respectively, and means to adjust said unit in a horizontal plane and in a direction at a right angle to the direction in which said frame is adjustable.

2. In a duplicating apparatus of the character described, a translucent platform, a subject projecting unit under the platform, a sectional frame for the platform extensible in a horizontal plane, means to extend said frame, means to adjust said unit in a horizontal plane in a direction at a right angle to the direction in which the platform is extensible, a stencil carrier plate, and means to mount said plate on one section of said frame for sliding adjustment on the section in a horizontal plane and in a direction at a right angle to the direction in which the frame is extensible.

ELMER HERDECK.